June 30, 1936.   J. N. ALEXANDER   2,046,231
SAW
Original Filed July 21, 1933
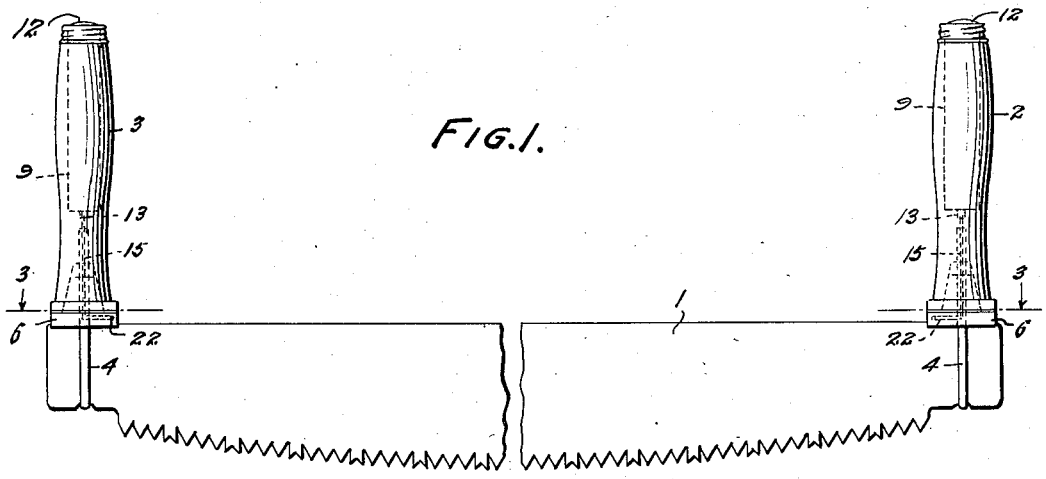
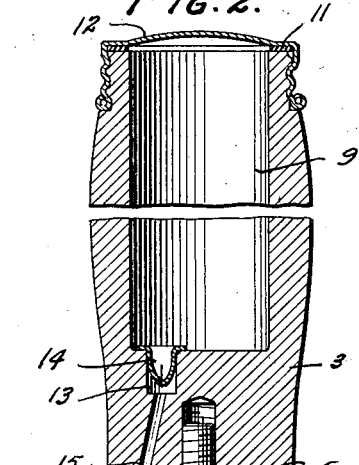
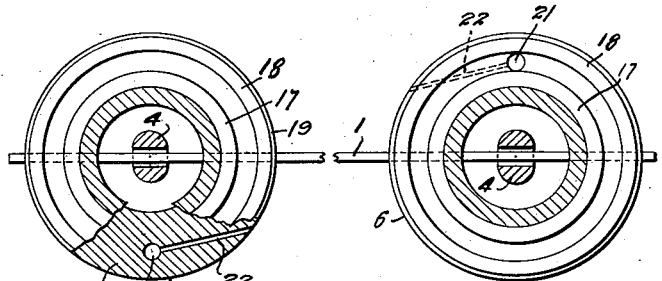
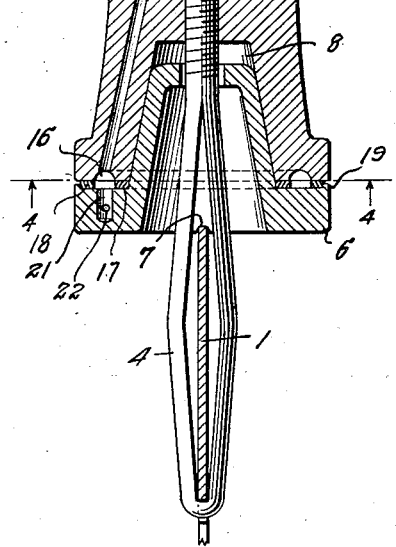
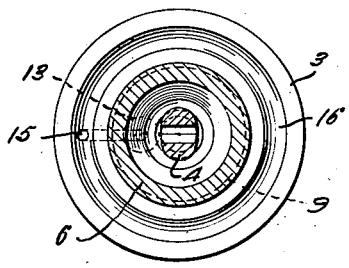
Inventor
JAMES N. ALEXANDER
By Semmes & Semmes
Attorneys Patented June 30, 1936

2,046,231

UNITED STATES PATENT OFFICE 2,046,231

SAW

James N. Alexander, Birmingham, Ala.

Application July 21, 1933, Serial No. 681,634
Renewed May 8, 1935

9 Claims. (Cl. 145—35)

This invention relates to saws, and more particularly has reference to a lubricating device for cross-cut saws.

As is well recognized, it is necessary to frequently lubricate a saw, and previously this operation has usually been carried out manually. If a saw requires lubrication during an actual sawing operation, it is, of course, necessary to interrupt such sawing and properly lubricate the blade. Obviously, this results in loss of time and efficiency. Furthermore, such manual operations do not insure a thorough lubrication, particularly when done by a careless workman.

Although there have previously been devices for automatically lubricating a saw, certain disadvantages reside in such prior devices. The principal objection is due to the fact that those devices do not insure a thorough lubrication of the working area, and in order to secure the same it is necessary to manually distribute the oil over the working area of the blade. For this reason, such devices are open to substantially the same objection as the system of manually lubricating the blade, above referred to.

An object of my invention is to overcome the above-mentioned, and other, disadvantages heretofore inhering in the lubrication of saw blades.

Another object of my invention is to provide a device for effectively lubricating the working area of the saw blade.

Yet another object of my invention is to provide a device whereby a saw blade may be lubricated without interruption to a sawing operation.

To accomplish the above, and other important objects as will appear hereinafter, my invention in general embraces means for supplying a lubricant to a saw blade, while an actual sawing operation is in progress, and such means being so adapted to discharge the lubricant upon the blade that the working area of the blade is maintained in a well lubricated condition.

In the accompanying drawing, I have disclosed one embodiment of my invention as applied to a cross-cut saw, it being, of course, understood that this particular embodiment may be modified in various particulars without departing from the spirit of my invention. In this drawing, in which corresponding numerals refer to the same parts:—

Figure 1 is a side elevation of a cross-cut saw equipped with my invention;

Fig. 2 is a vertical sectional view through one of the handles;

Fig. 3 is a sectional view along the line 3—3 of Fig. 1, looking in the direction of the arrows;

Fig. 4 is a sectional view along the line 4—4 of Fig. 2, looking in the direction of the arrows.

Referring more particularly to Fig. 1, I have shown a saw blade 1, partly cut away, provided with handles 2 and 3. These handles are preferably made of aluminum, because of ease of construction and certain qualities of durability, but it is to be appreciated that other materials may be substituted in lieu of aluminum.

Referring more particularly to Fig. 2, these handles are secured to the blade by means of conventional stirrups 4 which extend around each end of the blade. The stirrups 4 are provided with threaded shanks 5, and the handles 2 and 3 are adapted to be screwed thereon. A frusto-conical member 6 is adapted to be fitted over the stirrup, and is provided with diametrically opposed notches 7 which bear upon the upper side of the blade 1. The handles 2 and 3 are provided with frusto-conical recesses 8 which are adapted to receive the member 6 in a tight fit. It will, therefore, be seen that the handles 2 and 3 may be tightly secured to the blade by merely screwing the handles upon the stirrups 4. This results in a tightening of each stirrup around the lower edge of the blade, and forces the member 6 into firm engagement with the upper edge.

In describing the specific construction of the lubricating device, I shall refer now to one of the handles, it being understood that except in one respect, as will be hereinafter pointed out, the two handles are identical in construction. In the upper portion of the handle, there is drilled a recess 9 which serves as a reservoir for the lubricant. A washer 11 is positioned at the open end of the reservoir, and there is threaded over the open end a closure member 12. The upper part of this closure member is slightly convex, as shown in Fig. 2, and is composed of flexible material. The cap 12 may be made of tin, or some other suitable metal, or even a stiff and airtight woven material.

In the base of the chamber 9, there is drilled a seat 13, and there is positioned within this seat a one-way flip valve 14. The flip valve 14 is so constructed that it will remain closed under normal conditions—that is, it will remain closed when the pressure of the liquid within chamber 9 does not exceed that which normally results from the hydrostatic head of the lubricant. However, when this pressure is exceeded, by virtue of flexure of the cap 12, the valve 14 opens and permits a discharge of lubricant from the chamber 9.

Flip valve 14 is the rubber valve whose configuration is shown in cross-section in Fig. 2. This rubber valve is of nipple shape, the tip of the nipple being split as indicated in Fig. 2. See the line of the split in the cross-section of the flip valve 14. The rubber material gives at the teat. The split opens when the pressure pump is high enough to distort the rubber at the teat. The rubber is ordinarily sufficiently resistant to withstand the weight of the column of liquid in the reservoir 9 without permitting the split in the teat to open. Such valves are true pressure valves, and are of very simple construction.

Extending from the base of the seat 13 is a passage 15 which communicates with an annular groove 16 in the lower face of the handle.

Ring washers 17 and 18 are interposed between the lower face of handle 3 and the upper face of the base of conical member 6. A slight lip 19 is provided upon the upper face of the base of member 6 in order to insure proper seating of the washer 18.

A well 21 is drilled in the base of member 6 and is adapted to register with the annular channel 16 in the handle. It will be observed that, because of the annular channel 16, the well 21 will be in communication with the conduit 15 regardless of any rotation of the handle 3. It will be observed that the base member 6 is fixed against any rotational displacement with respect to the blade 1, and there extends from the well 21 a discharge channel 22. This channel is inclined slightly to the longitudinal axis of the blade 1, and the particular angle employed is such as to direct any lubricant discharged from the conduit 22 well out upon the blade of the saw. The lubricant is, therefore, discharged upon the working area of the blade where it is readily distributed as the saw passes through the wood. It will be noted that in Fig. 1 the channel 22 extends horizontally from the well 21. I have found that there is usually a sufficient drop in the jet of lubricant after it is discharged from the channel so that it strikes the blade. However, if there should be a tendency for the jet to pass over the top of the blade, because of excess pressure, or for some other reason, then of course the channel may be inclined downwardly.

It will be seen from Fig. 3 that each handle is provided with only one discharge passage 22, and the two discharge passages are on opposite sides of the blade. It is, of course, obvious, however, that each handle may be provided with two of these passages, one on each side of the blade. In such latter event, it might be possible to lubricate the saw effectively when only one of the handles is provided with a lubricating system. However, I find the preferable arrangement to be as shown in the drawing, in which both of the handles are provided with lubricating devices, one device being adapted to discharge oil upon one side of the blade, while the other is adapted to discharge upon the other side.

The operation of my invention is believed to be apparent from the foregoing. The cap 12 is unscrewed from the handle and the reservoir 9 filled with a suitable lubricant, such as a lubricating oil. The cap 12 is then replaced, and when it is desired to lubricate the blade, pressure is exerted upon the cap in order to depress the flexible portion. This increases the pressure upon the body of oil in the reservoir 9 sufficiently to open the flip valve 14. The oil is forced through the conduits 15, well 21 and discharged in a relatively fine stream from discharge conduit 22. This stream of oil impinges upon the blade at a point well within the working area of the blade. The subsequent passage of the blade through a block of wood serves to distribute this oil throughout the entire working area, and thus effectively lubricates the blade.

It will be appreciated that my invention may be easily and economically manufactured, and that it insures effective lubrication of a saw blade. Inasmuch as the oil strikes the blade at a point that passes through the wood in a normal sawing operation, such oil as is discharged upon the blade is automatically distributed throughout the working area of the blade. The only manual operation necessary is the flexure of the cap 12 which, of course, can be effected by slight pressure of the thumb. Manual spreading of the lubricant over the working area is thereby obviated.

While I have disclosed one embodiment of my invention, it is, of course, obvious that various modifications may be made in the details of construction without departing from the spirit of my invention, the scope of which is to be determined solely by the appended claims.

I claim:

1. A cross-cut saw comprising a blade, a handle for each end of the blade, a lubricant reservoir carried by each handle, and means carried by one handle for lubricating one side of the blade only, by forcefully ejecting a stream of lubricant and means in the other handle for similarly lubricating the other side of the blade.

2. A cross-cut saw comprising a blade, a handle at each end of the blade, a lubricant reservoir carried by each handle, means carried by one handle for discharging a lubricant upon one side of the blade only, by forcefully ejecting a stream of lubricant within the working area thereof, and means in the other handle for discharging a lubricant upon the other side of the blade only, by forcefully ejecting a stream of lubricant within its working area.

3. A cross-cut saw comprising a blade adapted to receive lubricant on both surfaces, a pair of handles therefor, each handle being provided with a reservoir to hold a supply of lubricant, a conduit in communication with each reservoir and adapted to direct a stream of the lubricant upon the working area of the blade, each reservoir discharging on one surface only, and on a different surface from the other reservoir, valves to normally prevent the passage of lubricant through the conduits, and means for opening the valves.

4. A cross-cut saw comprising a blade, a plurality of handles therefor, a reservoir in each handle to contain a supply of lubricant, a conduit in communication with each reservoir and adapted to direct the lubricant from the reservoir onto one side of the blade only, and a corresponding reservoir and conduit in the other handle adapted to discharge the lubricant upon the other side of the blade only.

5. A cross-cut saw comprising a blade, adapted to receive lubricant on both surfaces, a pair of handles therefor, each of said handles being provided with a reservoir near its top for the purpose of holding a supply of lubricant, a conduit extending from each of said reservoirs and adapted to discharge the lubricant onto the saw blade, a pressure valve to normally prevent passage of the lubricant from the reservoir to the conduit, and means at the top of the handle to increase the pressure of the lubricant in the reservoir, the lubricant from each reservoir being adapted to lubricate the opposite side of the blade from the other reservoir.

6. A cross-cut saw comprising a blade adapted to receive lubricant on both surfaces, a pair of handles therefor, each handle having drilled in its upper end a reservoir for a lubricant, a conduit extending from the reservoir to the base of the handle and adapted to discharge lubricant upon the working area of the saw blade, a pressure valve to normally prevent passage of oil from the reservoir to the conduit, and a flexible cap over the open end of the reservoir at the top of the handle, the lubricant from each reservoir being adapted to lubricate the opposite side of the blade from the other reservoir.

7. A cross-cut saw comprising a blade, a handle therefor, a reservoir carried by the handle, an angular groove in the base of the handle communicating with the reservoir, a member affixed with respect to the blade and having a well therein, said well communicating with the groove in the base of the handle and an outlet port from the well, said handle being revolvable with respect to the member, and means to eject a stream of lubricant from the reservoir to the groove through the well and outlet port on to the blade.

8. A cross-cut saw comprising a blade, a handle at each end of the blade, a lubricant reservoir carried by each handle, and means in the handles and shielded thereby for discharging a lubricant from each reservoir upon the working area of the blade, on one side only, each handle being adapted to discharge on a different side of the blade.

9. A cross-cut saw comprising a blade, a pair of handles therefor, each handle being provided with a reservoir shielded in its handle, conduits in communication therewith and adapted to discharge the contents of each reservoir upon one side of the blade only, each handle being adapted to discharge on a different side of the blade.

JAMES N. ALEXANDER.